US012619509B1

(12) United States Patent
Martin et al.

(10) Patent No.: US 12,619,509 B1
(45) Date of Patent: May 5, 2026

(54) INTEGRATED CIRCUIT TEST PATTERN INTERLEAVING

(71) Applicant: Synopsys, Inc., Sunnyvale, CA (US)

(72) Inventors: Denis Martin, Palo Alto, CA (US);
Bala Tarun Nelapatla, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 81 days.

(21) Appl. No.: 18/506,125

(22) Filed: Nov. 9, 2023

(51) Int. Cl.
| | |
|---|---|
| *G06F 11/263* | (2006.01) |
| *G06F 11/27* | (2006.01) |

(52) U.S. Cl.
CPC ............ *G06F 11/263* (2013.01); *G06F 11/27* (2013.01)

(58) Field of Classification Search
CPC ................................ G06F 11/263; G06F 11/27
See application file for complete search history.

(56) References Cited

U.S. PATENT DOCUMENTS

| | | | | |
|---|---|---|---|---|
| 2004/0268030 | A1* | 12/2004 | Cheung .................... | H04N 5/33 |
| | | | | 348/E5.081 |
| 2007/0214302 | A1* | 9/2007 | Kubo ................. | G06F 12/0806 |
| | | | | 710/305 |
| 2010/0287429 | A1* | 11/2010 | Maruyama ..... | G01R 31/318307 |
| | | | | 714/728 |
| 2014/0149800 | A1* | 5/2014 | Nishimaki ............ | G06F 11/263 |
| | | | | 714/40 |
| 2017/0103022 | A1* | 4/2017 | Kreinin ............... | G06F 9/30043 |
| 2017/0227602 | A1* | 8/2017 | Clerc ............ | G01R 31/318392 |
| 2018/0180673 | A1* | 6/2018 | Swoboda ......... | G01R 31/31705 |
| 2024/0319261 | A1* | 9/2024 | Lin .................... | G01R 31/2841 |

OTHER PUBLICATIONS

Priyank Kalla, Sequential Circuit Testing, "Sequential Circuits and Finite State Machines", University of Utah; Dec. 1, 2021, pp. 20.
Martin Keim, Electronic Design, "What's The Difference Between Scan ATPG And IJTAG Pattern Retargeting?" Jan. 22, 2013, pp. 11.
Bruce Swanson, Siemens Xcelerator Academy, Design for Test: "What is a Streaming Scan Network (SSN)?" Mar. 21, 2022, pp. 2.
Utpal, Faults, Testing & Test Generation, "Scan and ATPG Process Guide: ATPG and Failure Diagnosis Tools Reference Manual", Smith Text: 14.1, 14.3, 14.4; pp. 34. https://www.scribd.com/document/422090664/atpg.
Mahmut Yilmaz, "How does Scan Work? Scan Chain Operation for Stuck-at Test", pp. 15. https://www.scribd.com/document/36803467/How-Does-Scan-Work.

(Continued)

*Primary Examiner* — Mark D Featherstone
*Assistant Examiner* — Jeffrey Andrew Yang

(57) ABSTRACT

At least one processor may obtain a plurality of test pattern data sets for a plurality of cores of an integrated circuit to be applied via a shared testing input bus. The at least one processor may next generate a test data sequence including an interleaving of respective task procedures of the plurality of test pattern data sets, where the generating of the test data sequence includes generating sleep instructions for respective cores of the plurality of cores in accordance with the interleaving. The at least one processor may then apply the test data sequence via the shared testing input bus.

19 Claims, 9 Drawing Sheets

(56)     References Cited

OTHER PUBLICATIONS

T. Shinogi, Y. Yamada, S. Tsuruoka, "Parallel core testing with multiple scan chains by test vector overlapping", IEEE VLSI-TSA International Symposium on VLSI Design, Automation and Test, Apr. 27, 2005; Abtract Only, pp. 1.

Wenjing Rao, Ismet Bayraktaroglu, Alex Orailoglu, "Test Application Time and Volume Compression through Seed Overlapping", DAC 2003; Jun. 2-6, 2003, Anaheim, California, USA, pp. 6.

Wenjing Rao, Alex Orailoglu, "Virtual Compression through Test Vector Stitching for Scan Based Designs", University of California; Mar. 3-7, 2003, Messe Munich, Germany, pp. 6.

Woo Cheol Chung, Dong Sam Ha, "A New Approach For Massive Parallel Scan Design", Virginia Tech VLSI for Telecommunications, International Test Conference, 2005; pp. 10.

Bhargab B. Bhattacharya, Sharad C. Seth, Sheng Zhang, Double-Tree Scan: "A Novel Low-Power Scan Path Architecture", International Test Conference, 2003. Proceedings. ITC 2003., Charlotte, NC, USA, 2003, pp. 470-479.

Siemens Digital Industries Software, "Tessent Streaming Scan Network; No-compromise packetitized test", White paper, Jun. 2021; pp. 10.

* cited by examiner

200

| INSTRUCTIONS 210 | | |
|---|---|---|
| Codec DRC Opcode | 1111NNNNNNNNNNNN | XXXXXX |
| Codec DRC Data | 1NNNNNNNNNNNNNNN | XXXXXX |
| OCC Load Opcode | 0NNNNNNNNNNNNNN | XXXXX |
| OCC Load Data | 0100NNNNNNNNNNNN | XXXXX |
| --- | 1011010101010101 | XXXXX |
| --- | 1101011010101010 | XXXXX |
| Reseed Setup Opcode | 1101NNNNNNNNNNNN | XXXXX |
| Reseed Load Opcode | 0010NNNNNNNNNNNN | XXXXX |
| Reseed Data | 10110101010101 | XXXXX |
| --- | 11010110101010 | XXXXX |
| Dataless Load Unload | NNNNNNNNNNN | XXXXX |
| --- | NNNNNNNNNNNNNNN | XXXXX |
| Reseed Load Opcode | 0010NNNNNNNNNNNN | XXXXX |
| Reseed Data | 10110101010101 | XXXXX |
| --- | 11010110101010 | XXXXX |
| (Dataless) Load Unload | NNNNNNNNNNNNNN | XXXXX |
| --- | NNNNNNNNNNNNNN | XXXXX |
| (Dataless) Capture | NNNNNNNNNNNNNN | XXXXX |
| MISR Opcode | 1100NNNNNNNNNNNN | XXXXX |
| MISR Unload | NNNNNNNNNNNNNN | HLLHLH |
| (No Input Data) | NNNNNNNNNNNNNN | LHLLLH |
| No-Op Opcode | 0000NNNNNNNNNNNN | XXXXX |

*time*

250

| PHASES 255 | STATUSES 260 |
|---|---|
| OCC LOAD A | INPUTS ENGAGED, OUTPUTS IDLE |
| SEED A | INPUTS ENGAGED, OUTPUTS IDLE |
| DATALESS LOAD/UNLOAD | BOTH INPUTS AND OUTPUTS IDLE |
| DATALESS LOAD/UNLOAD | BOTH INPUTS AND OUTPUTS IDLE |
| DATALESS LOAD/UNLOAD | BOTH INPUTS AND OUTPUTS IDLE |
| SEED A | INPUTS ENGAGED, OUTPUTS IDLE |
| LAUNCH/CAPTURE | BOTH INPUTS AND OUTPUTS IDLE |
| SIGNATURE | OUTPUTS ENGAGED, INPUTS IDLE |
| OCC LOAD A | INPUTS ENGAGED, OUTPUTS IDLE |
| SEED A | INPUTS ENGAGED, OUTPUTS IDLE |
| DATALESS LOAD/UNLOAD | BOTH INPUTS AND OUTPUTS IDLE |
| DATALESS LOAD/UNLOAD | BOTH INPUTS AND OUTPUTS IDLE |
| DATALESS LOAD/UNLOAD | BOTH INPUTS AND OUTPUTS IDLE |
| DATALESS LOAD/UNLOAD | BOTH INPUTS AND OUTPUTS IDLE |
| DATALESS LOAD/UNLOAD | BOTH INPUTS AND OUTPUTS IDLE |
| LAUNCH/CAPTURE | BOTH INPUTS AND OUTPUTS IDLE |
| SIGNATURE | OUTPUTS ENGAGED, INPUTS IDLE |
| CODEC DRC | OUTPUTS ENGAGED DURING SELF-TEST, IDLE DURING PRODUCTION |

FIG. 2

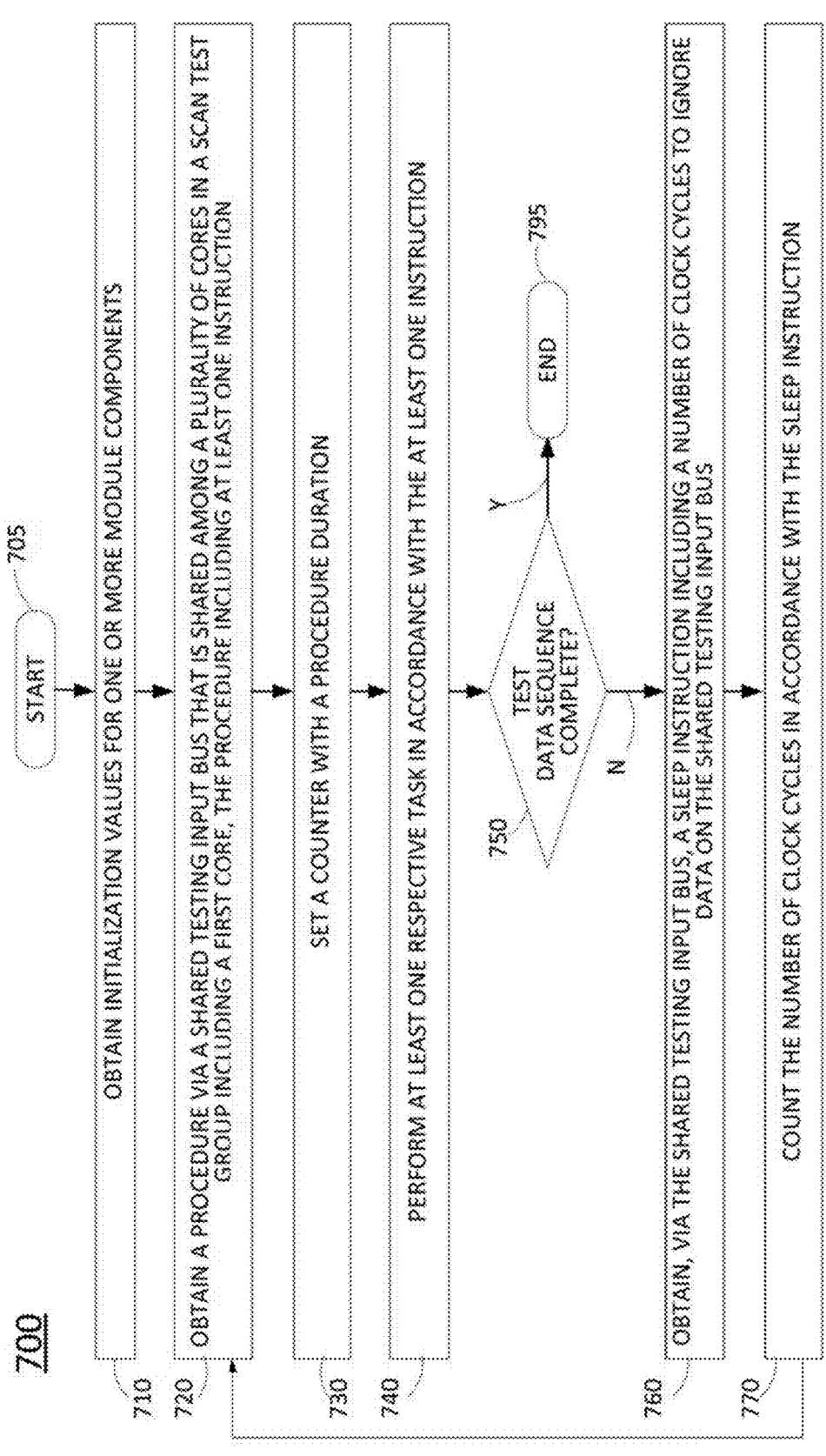

700

START 705

710 OBTAIN INITIALIZATION VALUES FOR ONE OR MORE MODULE COMPONENTS

720 OBTAIN A PROCEDURE VIA A SHARED TESTING INPUT BUS THAT IS SHARED AMONG A PLURALITY OF CORES IN A SCAN TEST GROUP INCLUDING A FIRST CORE, THE PROCEDURE INCLUDING AT LEAST ONE INSTRUCTION

730 SET A COUNTER WITH A PROCEDURE DURATION

740 PERFORM AT LEAST ONE RESPECTIVE TASK IN ACCORDANCE WITH THE AT LEAST ONE INSTRUCTION

750 TEST DATA SEQUENCE COMPLETE?

N

Y

END 795

760 OBTAIN, VIA THE SHARED TESTING INPUT BUS, A SLEEP INSTRUCTION INCLUDING A NUMBER OF CLOCK CYCLES TO IGNORE DATA ON THE SHARED TESTING INPUT BUS

770 COUNT THE NUMBER OF CLOCK CYCLES IN ACCORDANCE WITH THE SLEEP INSTRUCTION

INTEGRATED CIRCUIT TEST PATTERN INTERLEAVING

TECHNICAL FIELD

The present disclosure generally relates to and electronic design automation (EDA) system. In particular, the present disclosure relates to automatic test pattern generation and circuit testing.

BACKGROUND

During test pattern generation, automatic test pattern generation (ATPG) systems apply data sequences via scan channels to scan chains and/or scan compression compressors and decompressors (codecs). ATPG systems may use various methods to maximize the utilization of scan channels and to generate test patterns that may efficiently test for various faults.

SUMMARY

In one example, the present disclosure describes a method, computer-readable medium, and apparatus for generating a test data sequence including an interleaving of respective procedures of a plurality of test pattern data sets for a plurality of cores of an integrated circuit to be applied via a shared testing input bus. For instance, in one example, at least one processor may obtain a plurality of test pattern data sets for a plurality of cores of an integrated circuit to be applied via a shared testing input bus. The at least one processor may next generate a test data sequence including an interleaving of respective task procedures of the plurality of test pattern data sets, where the generating of the test data sequence includes generating sleep instructions for respective cores of the plurality of cores in accordance with the interleaving. The at least one processor may then apply the test data sequence via the shared testing input bus.

In one example, the present disclosure also describes a method, computer-readable medium, and apparatus for performing tasks in response to procedures obtained via a shared testing input bus according to sleep instructions including a number of clock cycles to ignore data on the shared testing input bus. For instance, a processor of a first core of an integrated circuit may obtain at least a first procedure via a shared testing input bus that is shared among a plurality of cores in a scan test group including the first core, the at least the first procedure including at least a first instruction. The processor may next perform at least a first task in accordance with the at least the first instruction. In addition, the processor may obtain, via the shared testing input bus, a sleep instruction including a number of clock cycles to ignore data on the shared testing input bus. The processor may then obtain at least a second procedure via the shared testing input bus, in response to a completion of the number of clock cycles, the at least the second procedure including at least a second instruction.

In one example, the present disclosure further describes a circuit including a finite state machine to track state changes of the circuit module in accordance with a procedure counter and instructions from a shared testing input bus, where the shared testing input bus is shared among a plurality of cores, and where the circuit is associated with a first core of the plurality of cores. The circuit may further include the procedure counter, to obtain counter values from instructions on the shared testing input bus and to decrement the counter values in accordance with a test clock, and a multiplexer including at least an input port for the shared testing input bus and a first select line that is controlled by the finite state machine, where the multiplexer is to pass data on the shared testing input bus to a codec of the first core when the finite state machine is in a load state.

BRIEF DESCRIPTION OF THE DRAWINGS

The present disclosure will be understood more fully from the detailed description given below and from the accompanying figures of embodiments of the present disclosure. The figures are used to provide knowledge and understanding of embodiments of the present disclosure and do not limit the scope of the present disclosure to these specific embodiments. Furthermore, the figures are not necessarily drawn to scale.

FIG. 2 illustrates an example test pattern data set for an individual block/core and a representation of a test data pattern set along with the statuses of an input bus and an output bus during various tasks of the test data pattern set;

FIG. 7 illustrates a flowchart of an example method for performing tasks in response to procedures obtained via a shared testing input bus according to sleep instructions including a number of clock cycles to ignore data on the shared testing input bus;

DETAILED DESCRIPTION

Figure 1:
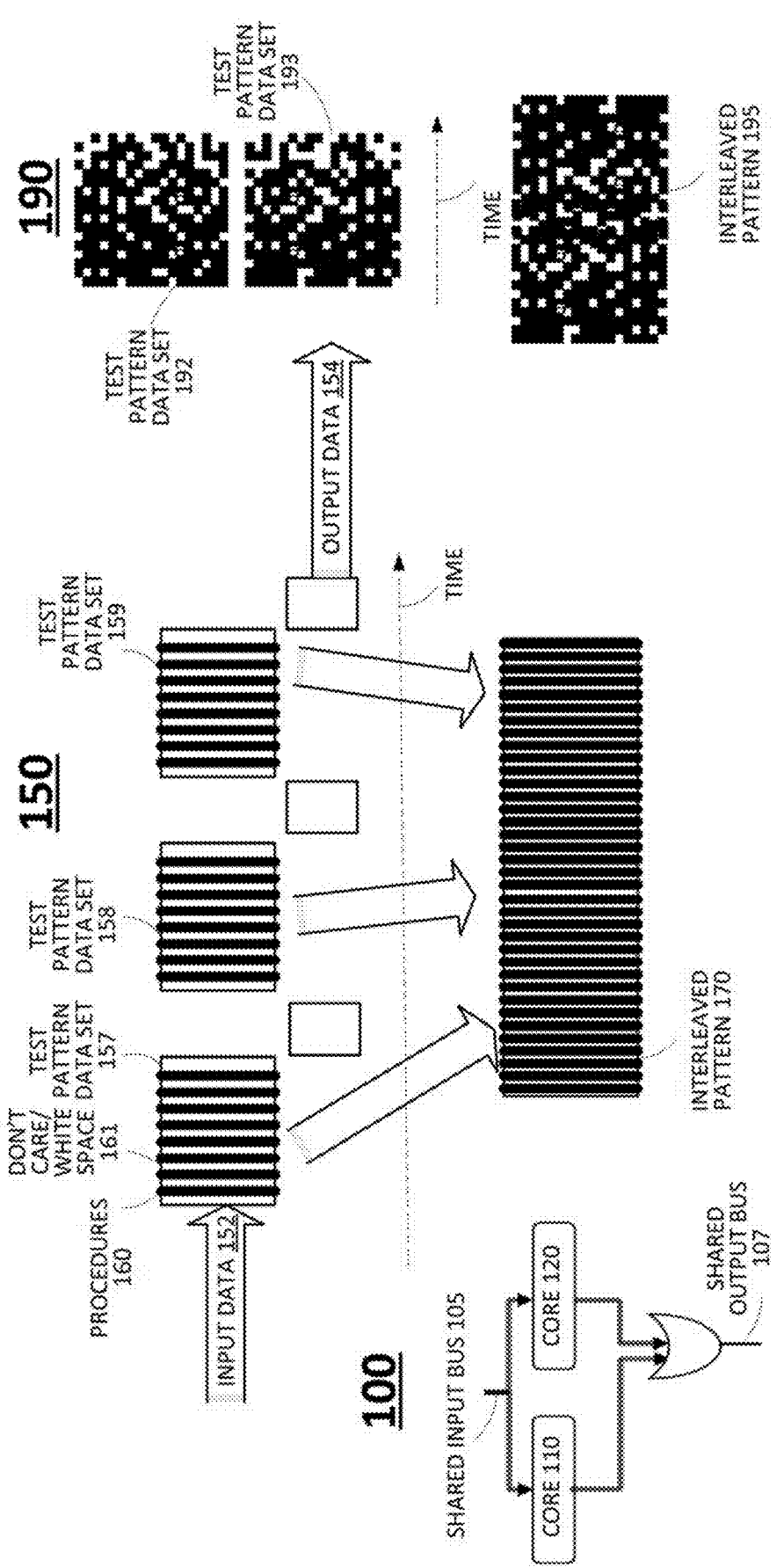
FIG. 1 illustrates aspects of a circuit including a test/scan group having two block/cores and further illustrates examples of interleaving of procedures from different test pattern data sets.

Aspects of the present disclosure relate to automatic test pattern generation and circuit testing. During test pattern generation, an automatic test pattern generation (ATPG) system applies data sequences via scan channels to scan chains and/or scan compression compressors and decompressors (codecs). An ATPG system may use various methods to maximize the utilization of scan channels and to generate test patterns that may efficiently test for various faults. Some approaches may use shorter scan chains, a higher scan compression ratio (e.g., a ratio of input pins to a number of scan chains), share the scan input channels for multiple codecs/subsystems (e.g., multiple system cores) during scan pattern generation, use artificial intelligence (AI) based techniques to reduce overall cycle count, and so forth. However, there is still redundancy within the test data from ATPG. These redundant/unutilized bits (referred to as don't-cares (which may be abbreviated as (DC) or (DCs)), may be randomly (irregular) scattered in scan in/out data, and gradually increases in prevalence towards later patterns in a test pattern set. In some cases, up to 50% of input and output test data is don't-care (redundant). Examples of the present disclosure relate to a system (e.g., an integrated circuit (IC)), with a shared test bus for multiple blocks, e.g., cores, in a test group (or scan group). In particular, examples of the present disclosure may include a module or circuit component that obtains (e.g., from ATPG component(s)) test pattern data sets for a plurality of cores of an integrated circuit to be applied via a shared testing input bus and generate a test data sequence including an interleaving of respective procedures of a plurality of procedures of the plurality of test pattern data sets to minimize an overall completion time for a testing of the plurality of cores in accordance with the plurality of test pattern data sets. The module may then apply the test data sequence via the shared testing input bus, e.g., to one or more blocks/cores and/or the codecs thereof. In other words, examples of the present disclosure may fill in the white space of one core with seeds of other cores (and similarly for the white spaces for each of the other cores).

To further illustrate, certain ATPG protocols may have well-grouped whitespace data, where don't-cares in test data may be more uniform and less scattered. For instance, 30-40% of test data may include don't-cares on both input and output. Examples of the present disclosure seek to place valid data (e.g., non-empty, also referred to as care data, or care bits) for blocks in the don't-care spaces of others. In one example, the present disclosure may include a protocol aware method that understands the nature of the scan/test data and allows for interleaving. In one example, an ATPG compression protocol may use clearly identified spaces with minimal overhead, where the overhead of the packing protocol may be offset by improved utilization. In one example, a hardware module acts as a gatekeeper to ensure blocks consume only relevant data, while a software module optimizes the interleaving of the test data of different blocks. Examples of the present disclosure may utilize whitespace, or don't-cares by: removing protocol overhead by programming operation codes (opcodes) and instruction registers during shift operations (e.g., dataless shift), using inputs for one block during output procedures for another block, such as for unload operations (e.g., multiple input shift register (MISR) unload), using outputs for one block during input procedures for another block (such as on-chip clock (OCC) load, reseed load, etc.), using data-less cycles (e.g., dataless shift) during a capture window of one codec/block with input/output procedures of another codec/block, and so forth.

Technical advantages of the present disclosure include, but are not limited to, successful identification of redundancy within test pattern data sets (e.g., the outputs of ATPG) and optimized utilization of a shared test/scan input bus across multiple test pattern data sets for a plurality of different blocks/cores in a scan/test group. In addition, examples of the present disclosure provide simplified planning, allowing fast input/output channel assignments for all codecs with different scan chain counts and efficient test-pin allocation (e.g., accurate distribution of test general purpose input/output pins (GPIOs) among blocks based on their absolute data volumes). Examples of the present disclosure may obtain a two to three time reduction in time to result (TTR) as compared to other solutions (e.g., with same or better quality of result (QoR)). In addition, an improved QoR may be obtained with a same TTR. For instance, more test patterns for one or more blocks may be completed in the same amount of time as compared to a sequential application of test pattern data sets for different cores in a scan/test group. An effective throughput may also be improved by up to 100% or more, e.g., as compared to sequential application of test pattern data sets for each core. Examples of the present disclosure also provide an improved computing device or system implementing examples of the present disclosure. For instance, a computing device may more quickly complete circuit testing, e.g., via automatically generated test patterns for various blocks. In addition, a computing system may be improved insofar as additional processing to redesign a circuit for DFT may be reduced or eliminated, e.g., relating to scan chain and/or scan group design. Similarly, an improved circuit manufacturing process may result insofar as a number of circuit elements or circuit complexity may be reduced (e.g., for scan chain fabrication). For example, more complex hardware designs for scan/test groups, scan chain layout, or the like may be omitted when reduced TTR can be provided as described herein. These and other aspects of the present disclosure are discussed in greater detail below in connection with the example(s) of FIGS. 1-9.

FIG. 1 illustrates example aspects of a circuit including a test group 100 having two blocks or cores 110 and 120. A shared input bus 105 (e.g., a shared testing/scan input bus) feeds both cores 110 and 120. The cores also share an output bus 107. FIG. 1 further illustrates, an example 150 of utilizing a share input bus (e.g., input bus 105) and a shared output bus (e.g., output bus 107) in accordance with an ATGP protocol. In the example 150, the input data 152 and output data 154 may follow a pattern in which test pattern data sets for each block (e.g., test pattern data sets 157-159) are applied and outputs are obtained sequentially. In the example 150, within each test pattern data set 157-159, the input data follows a general pattern of test pattern procedures 160 interspersed with whitespace 161 or don't-cares. In accordance with the present disclosure, an interleaved pattern 170 for a shared input bus (e.g., input bus 105) may be generated by filling whitespaces of one block with valid data of other cores (and so forth, for each block), resulting in a reduction in the overall time to result (TTR). In an additional example 190, test pattern data sets 192 and 193 represent test patterns with procedures and whitespace scattered throughout (e.g., more irregularly interspersed), and with don't-care blocks, or bits, identified even within data words. It should also be noted that towards the tail ends of the test pattern data sets 192 and 193, there is more whitespace. An example resulting interleaved pattern 195 is also illustrated in FIG. 1 where the total duration of time to complete procedures for both test pattern data sets 192 and 193 is less than if the test pattern data sets 192 and 193 were to be performed sequentially.

FIG. 2 illustrates an example test pattern data set 200 for an individual block. For instance, the test pattern data set 200 may be generated via an ATPG system. With reference to an example ATPG protocol, input patterns may be more intensive, with less output data. For instance, input data characteristics may include: free running automatic test equipment (ATE) clock (except during test setup), many gaps for don't-care in scan-in data, no scan enable, Joint Test Action Group (JTAG) remaining static (during scan pattern), and no other miscellaneous hold constraints. Output data characteristics may include: multiple input shift register (MISR) unload may occur during production, and codec data register control (DRC) may have output data during self-test patterns. In one example, scan input data occurs in bursts, so scan chains shifts are not continuous. As a result, scan input pins are sometimes idle and need not have instructions or seeds for every cycle. In addition, scan input data and core chain shifting may be decoupled. Thus, core chains can shift even if scan inputs are idle. In addition, input and output of data does not occur simultaneously, leaving the data bus free in one direction free, while the data bus in the other direction is being used.

In one example, a procedure in a test pattern data set in accordance with an ATPG protocol may include an instruction, otherwise referred to as an opcode. Depending on the instruction, some procedures may further include data for a data register that may be identified by the opcode or seed data to load into the core/block. In one example, a duration of time to load the data is pre-programmed for all processes except reseed. For Reseed Load Opcode (e.g., an instruction to load reseed data), the data itself may contain loading duration information (e.g., a number of clock cycles). In one example, scan-ins and scan-outs are only simultaneously operational during codec data register control (codec_drc). In accordance with such an example ATPG protocol, a testing input bus can be left idle. If a no-op instruction is sent to a block, a test mode module may simply wait.

Referring again to the example of FIG. 2, the test pattern data set 200 includes a number of instructions 210, such as "Codec DRC Opcode" (codec data register control, e.g., an instruction affecting the state of a data register), "OCC Load Opcode" (e.g., an instruction to change the state of an on-chip clock), "Reseed Setup Opcode" (e.g., an instruction to prepare to receive reseed data), "Reseed Load Opcode" (e.g., an instruction to load reseed data), "MISR Opcode" (e.g., for a multiple input shift register), and a "No-Op Opcode" (e.g., for no instructions or data to load). To further illustrate, the input data bus may include a 16 bit word, of which 4 bits may be used for instructions/opcodes. For instance, "Codec DRC Opcode" may be indicated by the value 1111, "OCC Load Opcode" may be indicated by the value 0100, "Reseed Setup Opcode" may be indicated by the value 1101, "Reseed Load Opcode" may be indicated by the value 0010, "MISR Opcode" may be indicated by the value 1100, and "No-Op Opcode" may be indicated by the value 0000 in these bits. "N" and "X" may include don't-care values for various bits in various words. It should also be noted that some of the instructions/opcodes may be followed by data to be loaded into a register or to pass to a block/core (e.g., seed data may be passed to a codec thereof for distribution to one or more scan chains, for unpacking, for selection or generation of data on-block in accordance with the seed data, etc.). In addition, it can be seen that valid data is only found on the output bus in connection with a "MISR unload" following a "MISR Opcode." The output bus remains idle, e.g., whitespace or don't-care, for the majority of the time.

FIG. 2 further illustrates a representation 250 of a test pattern data set having various phases 255 with a column indicating the statuses 260 of an input bus and an output bus during various tasks of the test pattern data set. For instance, during "OCC Load" for a block/core (e.g., block/core "A"), the input bus may be engaged while the output bus is idle. Similarly, while seed data is loaded for block/core A, the input bus may be engaged while the output bus is idle. Notably, the seed data loading may be followed by a dataless load and/or unload where both the input bus and output bus may remain idle. For instance, the dataless load/unload may include operations to load one or more scan chains with data that is internal to block/core A (e.g., which may be generated within the core based on the seed data and/or which does not otherwise rely upon additional data on the testing input bus). Statuses 260 for the input and output busses for other phases are further provided in the representation 250.

Figure 3:
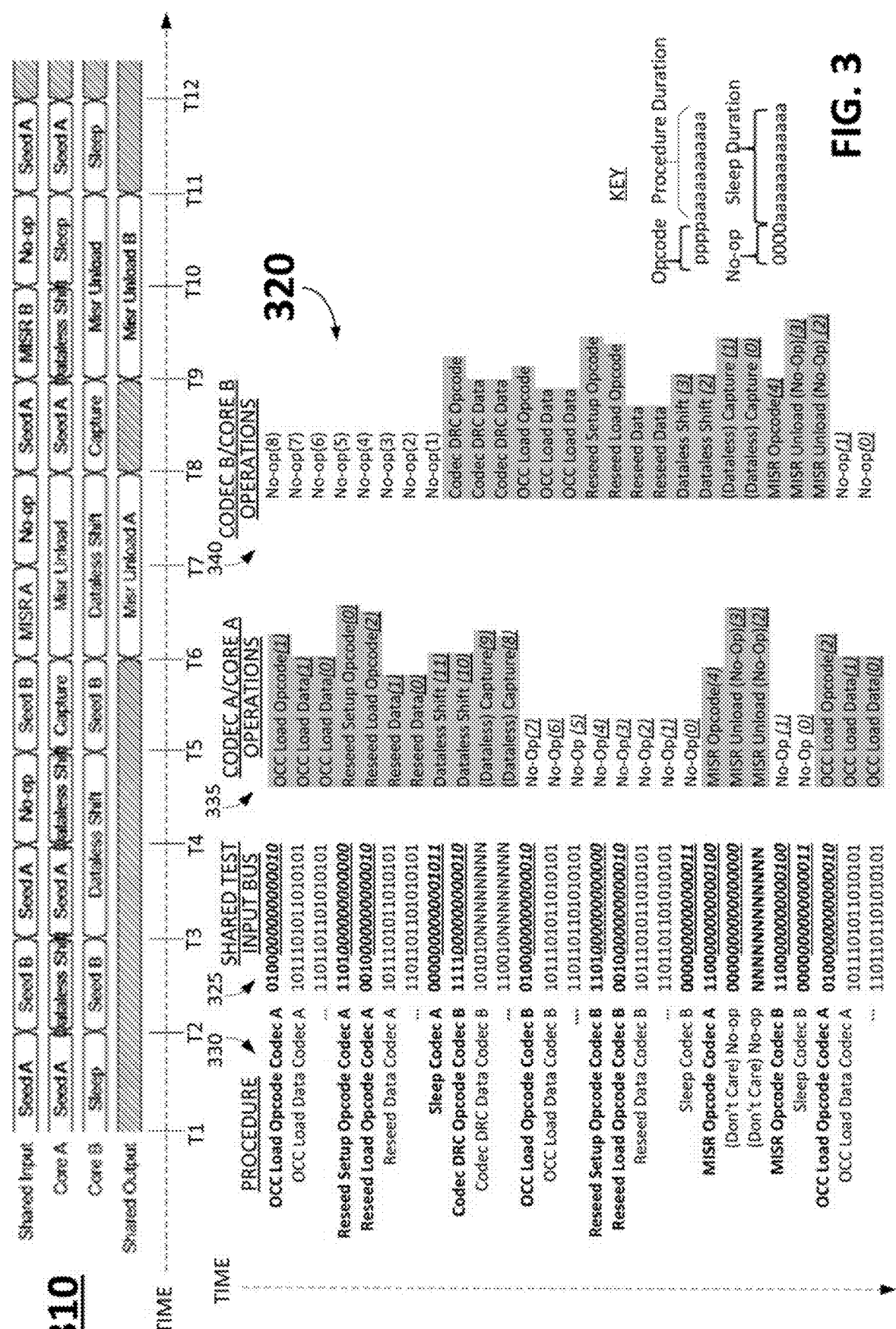
FIG. 3 illustrates an example timing diagram for two block/cores and a test data sequence for an example of two blocks/cores.

The foregoing describes and illustrates an example for a single block/core. As discussed above, the present disclosure extends to interleaving of test pattern data sets to provide a test data sequence on a shared bus. FIG. 3 illustrates an example timing diagram 310 for two blocks/cores (e.g., core A and core B). For instance, the timing diagram 310 indicates the data on the shared input data bus and shared output data bus in each time block, as well as the operations being performed by core A and core B within each time block. For instance, at time T1, the shared input bus may contain seed data for core A. In addition, core A may be loading this seed data as it appears on the shared input bus. At the same time, core B may be in a sleep state, while the shared output bus may be idle. At time T2, the shared input bus may contain seed data for core B. In addition, core B may be loading this seed data as it appears on the shared input bus. The shared output bus may still remain idle. However, at time T2, core A may be engaged in a dataless shift operation (or operations). Notably, if test data pattern sets for each core were to be applied sequentially, the shared input bus would be unutilized while core A engaged in one or more dataless shift operations. In addition, core B would also remain idle and would wait for the entire testing of core A to be completed before commencing with the test data pattern set for core B. In contrast, in accordance with the present disclosure, the shared input bus is populated with valid data for more time blocks in addition to cores A and B being able to engage in test operations simultaneously.

Timing diagram 310 further illustrates that at time T3, additional seed data may be presented on the shared input bus for core A, which core A may load while core B may ignore the shared input bus and engage in dataless shift operations. It should be noted that a scheduling algorithm may not perfectly provide for continuous utilization of shared input bus. Thus, for example, time T4 indicates that the shared input bus is idle while both core A and core B are engaged in dataless shift operations. For instance, a scheduling algorithm of the present disclosure may still be constrained by a requirement that the test data pattern sets for respective cores proceed in-order. In the present example, the dataless shift for core B may extend over two time periods, T3 and T4. The next instruction/procedure for core A may be scheduled in time T3. However, core A may also use time period T4 for a dataless shift. Thus, neither core A nor core B is ready for a next instruction/procedure at time T4. Utilization of additional time periods and the corresponding data on shared input bus, data on shared output bus, and procedures for core A and core B are further shown in the example timing diagram 310.

FIG. 3 additionally illustrates a test data sequence 320 for an example of two blocks/cores (where codec A may refer to a codec for block/core A and where codec B may refer to a codec for block/core B (e.g., decompressors of the respective blocks/cores)). The test data sequence 320 is illustrated in the example of FIG. 3 with input data 325 on the shared input bus in successive clock cycles. A corresponding description of procedure details 330 is further provided in the leftmost column, while descriptions of the operations on codec A/block B and codec B/block B are provided in columns 335 and 340. Similar to the example of FIG. 2, in some clock cycles the shared input bus may contain instructions/opcodes, where four bits of each 16 bit word may contain the opcode (e.g., (0100) for OCC Load Opcode, (1101) for Reseed Setup Opcode, (0010) for Reseed Load Opcode, (1111) for Codec DRC Opcode, and so forth. In addition, the present example further illustrates that in clock cycles in which the input bus contains an instruction, additional bits of the current word may include procedure duration information. For instance, in the first clock cycle illustrated in the present example, the instruction is an OCC Load Opcode. The last two bits are (10) and may indicate that the next two clock cycles may contain data for the OCC load. In other words, the shared input busy may carry data to load into an OCC register of block A in the next two clock cycles (indicated by (10), e.g., two in base 10 numbering). In clock cycle 4, the Reseed Setup Opcode/instruction may not involve the loading of any data into a register or transfer to the block/core. As such, the following clock cycle, clock cycle 5 may include a next instruction, e.g., "Reseed Load Opcode." However, this task may include the loading of data. As such, in clock cycle 5, the word on the shared input bus may also include a duration of the seed data to follow, e.g., binary (10) indicating that the following two clock cycles will include seed data.

Notably, the test data sequence 320 includes instructions and payload data for both cores/codecs A and B. In the present example, to ensure that each core/codec receives the respective correct instructions and payload, the test data sequence 320 may further include sleep instructions which indicate to modules of respective cores/codecs when/for how long to ignore data on the shared input bus. These modules may be referred to herein as protocol decoders, and may be situated between ATPG systems and/or testing modules and the respective blocks/cores under test. To further illustrate, the four most significant bits in the $8^{th}$ clock cycle include a sleep instruction (0000). In addition, the least significant bits include a sleep timer e.g., (1011) indicating to sleep for 12 clock cycles. It should be noted that in the example of FIG. 3, up to 12 bits may be allocated to indicate a sleep duration in other instances. In the present example, codec/block A may sleep for the next 12 clock cycles, which may contain instructions and/or payload for core B. Codec/block A may receive its next instruction thereafter (e.g., MISR Opcode). It should also be noted that for the first 8 clock cycles in which codec/block A may receive instructions/payload, a module for block B may be in a sleep mode and may ignore the data on the shared input data bus. For instance, the module, e.g., a protocol decoder, for block B may have been placed in the sleep mode by a prior sleep instruction for block B. For example, the first clock cycle in the test data sequence 320 may not be the very first clock cycle, but may simply include the first clock cycle that is illustrated in FIG. 3, where additional clock cycles may precede and/or follow that which is illustrated in the FIG. 3. Alternatively, each module/protocol decoder may maintain a procedure counter, e.g., a procedure register, which may count down the sleep timer (as well as the number of clock cycles for different instructions/procedures, such as two clock cycles to load seed data, etc.). In one example, this counter/register may be pre-programmed with an initial sleep value. For instance, codec/block A may have an initial sleep value of zero, while codec/block B may have an initial sleep value of 8 (e.g., binary 111). In one example, the initial sleep values may be populated into the procedure registers of respective modules/protocol decoders for respective blocks/cores via a separate loading methodology. Related aspects are described in greater detail below in connection with the example protocol decoder 500 of FIG. 5.

As noted above, descriptions of the operations on codec A/block B and codec B/block B are provided in right-most columns. Notably, 34 clock cycles may be occupied if the respective instructions, payload, and operations of codec/block A and codec/block B were to be performed sequentially (e.g., all highlighted clock cycles for both codec/block A and codec/block B). In contrast, via interleaving as illustrated, the same number of procedures may be completed in 27 clock cycles. It should also be noted that as further progression is made into test pattern data sets, the amount of whitespace may generally increase, providing opportunity for even greater time savings.

For illustrative purposes, the example test data sequence 320 relates to two blocks. However, in other, further, and different examples, additional blocks/cores may also be included in a scan/test group having shared scan/test input and scan/test output busses. In such cases, proper sleep timing may ensure that the appropriate blocks receive instructions and payload and the designated times on the shared input bus.

The configuration of the protocol decoder elements (e.g., initialization of procedure counter, MISR offset and MISR unload counters/registers) may be calculated as part of a scheduling phase. Conceptually, the scheduling task may be characterized as an attempt in sequencing multiple processes/tasks (micro-bursts) onto a single shared testing/scan input bus in such a way as to minimize the overall completion time. Each test pattern data set is effectively a sequence of micro-bursts constrained to be applied in-order, with minimum latencies to account for autonomous operation of a finite state machine (FSM) that maintains a current state of a protocol decoder. Using task scheduling terminology, the scheduling problem may be described as: $1|chain (l_{i,j})|C_{max}$.

Figure 4:
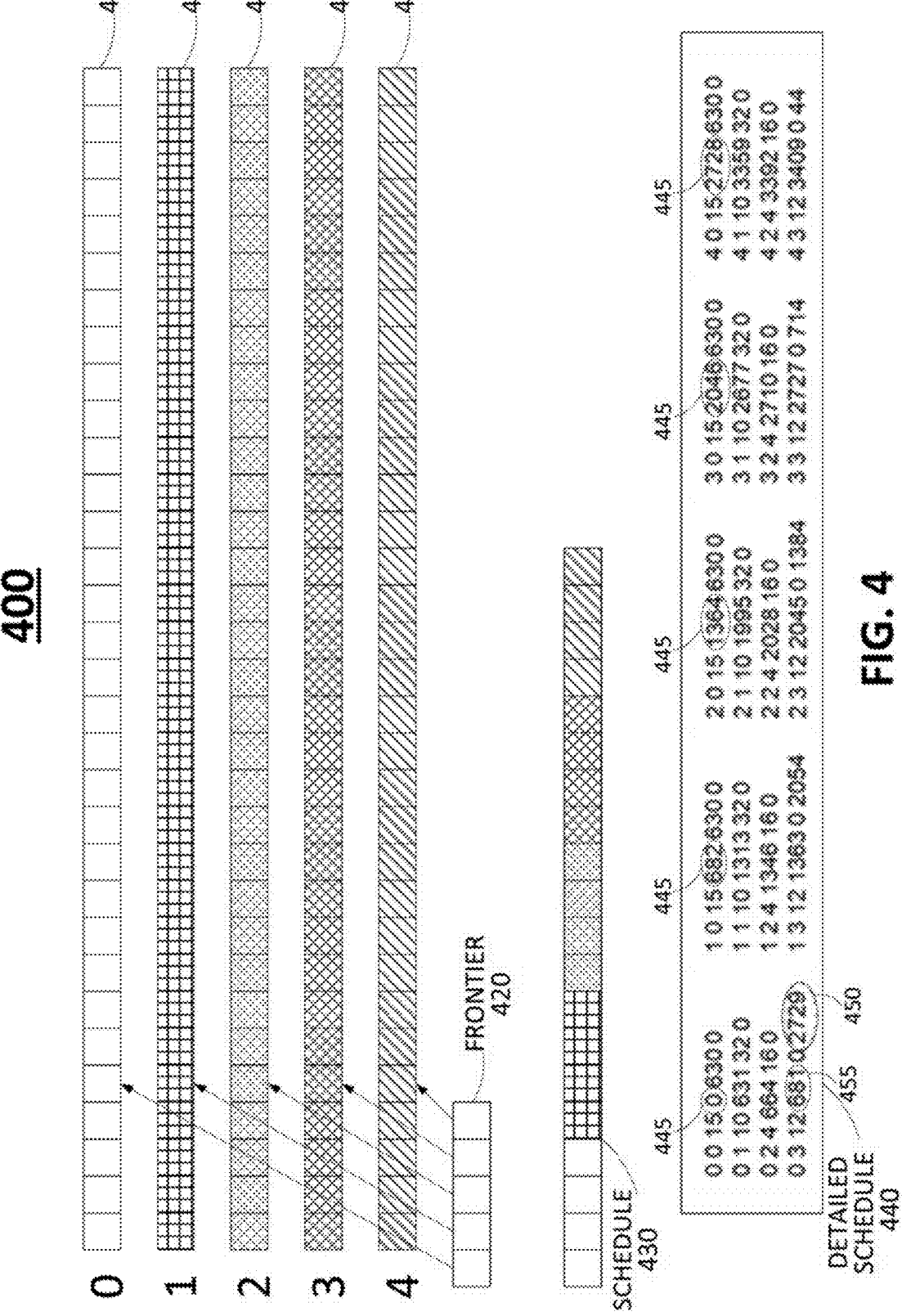
FIG. 4 illustrates an example scheduling phase for five test pattern data sets for respective blocks/cores.

To further illustrate, FIG. 4 depicts an example scheduling phase 400 for five test pattern data sets for respective blocks/cores. In one example, each test pattern data set 0-4 may first be unrolled and represented as a sequence of (dataless) micro-bursts. In one example, a micro-burst may be characterized by an opcode, a payload size, and a minimum number of cycles. The clock cycle in which an opcode appears does not carry payload, so the payload size is at most one less than the minimum number of cycles required.

The micro-burst sequences of multiple test pattern data sets 410-414 are then scheduled, e.g., linearized into a single sequence of micro-bursts. Because of the sequencing constraints imposed by each test pattern data set 0-4, an atomic scheduling decision may include choosing the chain (test pattern data set) from which the next micro-burst is selected. In one example, pointers may be maintained to track the next available micro-burst in each test pattern data set. Collectively, these pointers may be referred to as a frontier 420. In one example, the scheduling algorithm may be reduced to an algorithm that picks the next micro-burst from the frontier 420. Once a micro-burst is selected, the various parameters, e.g., exact start cycle time, procedure counters of previous micro-bursts, etc., may be computed to ensure that each block/core receives the proper data in a desired sequence, and to ensure that no output data is overwritten. This task may be referred to as legalization, which may be distinct and independent from the scheduling algorithm selection itself. The outcome of legalization may be to produce a desired sequencing, e.g., where there are no collisions between data for different blocks on the shared input bus at the same time. In particular, a random scheduling algorithm can be legalized into a correct sequencing.

In one example, each micro-burst in a scheduled test data sequence (schedule 430) may include a tuple: [<PatID><BurstID><OpCode><Cycle><Data><Wait>].

The PatID and BurstID pair refers to an input micro-burst. Pattern data can be retrieved and assembled into the ported test data sequence.

The detailed schedule 440 shows the state of computation after one round of round-robin scheduling. The numbers labeled 445 are the first cycle of the first micro-burst from each test pattern data set in the detailed schedule 440. These are also the initialization values for procedure counters associated with respective blocks/cores. The circled value (2729) (labeled 450) may be computed when the next micro-burst for block 0 is scheduled (e.g., clock cycle 3410). As further illustrated the circled value 681 (labeled 455) indicates the last clock cycle for block 0 (where the following number zero (0) indicates no subsequent clock cycles in the procedure duration), while the first clock cycle for block 1 is clock cycle 682. In addition, the opcode for each of the last procedures in a burst is 12 (which in the present example may be a sleep opcode; while in the example of FIG. 3, (0000) may include the sleep opcode). It should also be noted that for illustrative purposes, the present example provides for four instructions/opcodes per micro-burst for each of the initial micro-bursts selected for the cores 0-5. However, in other, further, and different examples, more or less instructions may be included in each burst, such as three instructions, two instructions, one instruction, five instructions, etc.

If K pattern sets have an average of N microbursts, the number of possible scheduling solutions is KN. The frontier-based approach is effectively a sequence of K*N decisions. While information-less decisions (random, round-robin) may result in reasonable overall performance, additional examples of the present disclosure may be based upon one or more heuristics. For instance, such heuristics may include: look-ahead functions (e.g., number of bursts/data cycles/no-op cycles in a sequence), incremental computations, bounding of the distance (time) between two bursts of the same sequence (compacity), K-way parallelization, and so forth. In one example, peep-hole optimization may also be implemented, such as locally permuting some micro-bursts to "squeeze the bubble out." In one example, heuristic approaches may be selected based upon goodness measures and empirical testing (e.g., benchmarking with TTR and/or QoR based on application to various test circuits). Alternatively, or in addition, heuristics approaches may be weighted via such testing, e.g., where multiple heuristics may be used in combination.

As noted above, the extraction of relevant data for a particular block/core from an interleaved test data sequence may be provided by a local module (e.g., a circuit, or a circuit portion, which may be referred to as a protocol decoder), each attached to a respective block/core. A set of concurrently active protocol decoders, e.g., in a scheduling group (also referred to as a testing group or scan group), may be distributed across an IC with arbitrary input and output pipeline depths. There are no limits on the number of concurrently active decoders in a scheduling group. In addition, it is permissible for blocks/cores to have different input/output (I/O) interface sizes. However, the effective size of the procedure counter (as used for scheduling) may be limited by the smallest input interface among blocks/cores in the scheduling group. It should also be noted that mismatches in sizes may result in less-than-optimal bandwidth utilization. Nevertheless, in one example, an IC may have multiple disjoint scheduling groups using non-overlapping channels. The preferred I/O assignment for a scheduling group is that its components share a unique input channel (a subset of the input rail) and a unique output channel (a subset of the output rail). Examples of the present disclosure may also include more complex configurations in which a scheduling group has multiple input channels sharing a single output channel, or a single input channel for multiple output channels, with accommodation in the scheduling algorithm accordingly. In the latter case, the multiple output channels may be merged to accommodate cores with larger output interfaces as available in any single output channel. In any case, cores/blocks may still be statically assigned to an input channel and output channel.

Figure 5:
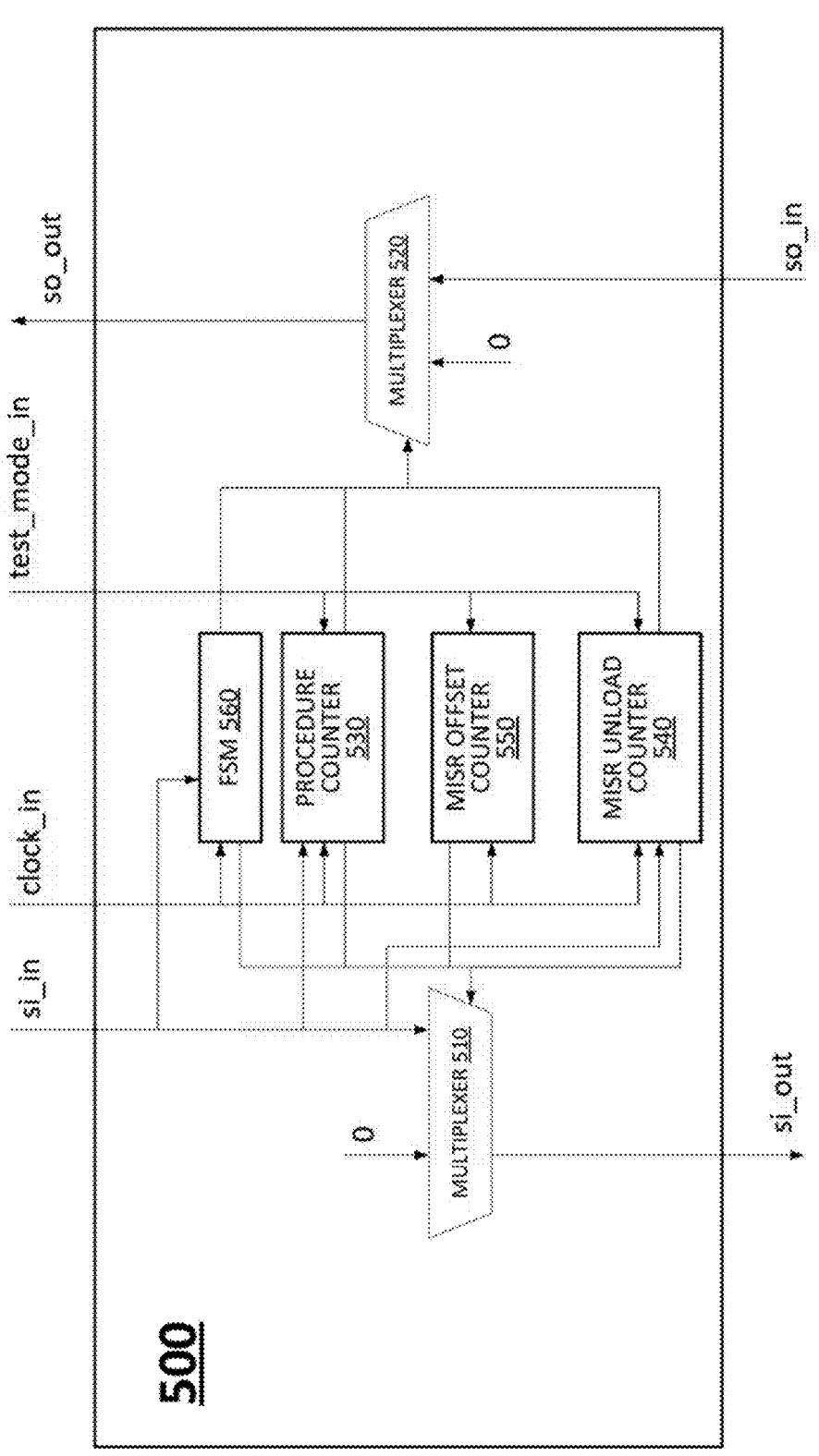
FIG. 5 illustrates an example protocol decoder (e.g., a circuit module, or a portion thereof)

FIG. 5 illustrates an example protocol decoder 500 (e.g., a circuit or a circuit portion). The protocol decoder may be associated with a block/core from among a plurality of blocks/cores in a scheduling group (or test/scan group) having a shared input bus and shared output bus. Thus, for example, si_in may include the shared input bus, so_out may include the shared output bus. In addition, si_out may include an output of the protocol decoder 500 (e.g., to selectively pass data from the shared input bus si_in to the block/core, such as to a codec thereof, via multiplexer 510). Similarly, so_in may convey scan/test output data from the block/core, which may be passed by the protocol decoder 500 via multiplexer 520 to the shared output bus via so_out. The input clock_in provides the reference clock for the protocol decoder, which is the same clock used for test/scan operations within the block/core. In one example, protocol decoder 500 may include a bypass mode in which si_in may simply pass through to si_out without additional control applied by the protocol decoder 500.

The input test_mode_in may be used to set initial values for registers (e.g., procedure counter 530, MISR unload counter 540, and MISR offset counter 550). The function of procedure counter 530 is described above, e.g., counting down for each procedure (including sleep). Each counter may be initialized during test setup (e.g., via test_mode_in), but only the procedure counter 530 is loaded from scan in (si_in) during testing. The MISR unload counter 540 may act as a write-enable signal for the shared output bus (so_out). For instance, the MISR unload counter 540 may keep a control signal (misr_unload) high for a duration of an unload operation (e.g., for multiplexer 520 to select so_in). Otherwise, null data (logic zeros) may be selected by multiplexer 520. In one example, the procedure counter 530 may include 28 bits to measure duration of procedures (including sleep, no-ops, or otherwise). In one example, the MISR unload counter 540 may include 10 bits and may define a number of clock cycles for which an unload operation (MISR_unload) should proceed (e.g., a number of clock cycles to hold a control signal for multiplexer 520 in a high/logic one (1) state). The MISR offset counter 550 may define how long the protocol decoder 500 should wait before commencing an unload (MISR_unload), e.g., in response to a MISR_unload opcode/instruction. In one example, the MISR offset counter 550 may include 12 bits and may be used to define and implement an offset for scan outputs from identical cores (described in greater detail below). In one example, the test_mode_in may have a width/word size to accommodate the number of bits to initialize the procedure counter 530, the MISR unload counter 540, and the MISR offset counter 550.

In one example, the finite state machine (FSM) 560 may use three bits to define six states controlling the different functions of protocol decoder 500. In one example registers for MISR offset counter 550, MISR unload counter 540, and so forth may be Institute of Electrical and Electronics Engineers (IEEE) 1687 (Internal Joint Testing Action Group (I-JTAG)) compliant. It is again noted that procedure counter data and test pattern data are delivered on the same input bus to all protocol decoders in a scheduling group, or scan/test group. This enables interleaving of data bursts which may be of variable lengths via standardized interfaces, where the full bus width can be used for data transfer. One clock cycle of additional overhead may be incurred to deliver a "sleep" value, e.g., a number of cycles the protocol decoder 500 should wait to process the shared input (si_in).

In one example, six registers may be used for the FSM 560 for one-hot encoding. The six states of FSM 506 may include:

RESET: a state while reset_in=0 (not shown in FIG. 5); counters are reset to "0" in this state.

INIT: follows the RESET state; in this state, counters are initialized with data from test_mode_in. This state may last one clock cycle.

SLEEP: state dedicated for no operations (no-op) by the protocol decoder 500 (opcode=0000). The FSM 560 may remain in this state until the value in the procedure counter 530 reaches 0. The block/core (e.g., a codec thereof) may be in dataless shift [load_unload], no operation [no-op], or in data capture [capture] mode during this state. Upon waking from the SLEEP state, FSM 560 may proceed to the LOAD state, MISR_OFFSET state, or MISR_UNLOAD state depending upon the next instruction on the share input si_in (and depending upon the MISR offset counter (if not zero)).

LOAD: in this state, the protocol decoder 500 transfers data from si_in data to the block/core (e.g., a codec thereof) via si_out. Following the LOAD state, FSM 560 may proceed to a SLEEP state, MISR_OFFSET state, or MISR_UNLOAD state depending upon the next instruction on the share input si_in.

MISR_UNLOAD: in this state, data on so_in from the codec/block/core is propagated via multiplexer 520 to the shared output bus on so_out. Permitted transitions from the MISR_UNLOAD state are to SLEEP (if procedure counter is not equal to zero (0)) or to LOAD.

MISR_OFFSET: this state defines a no operation (no_op) before MISR_UNLOAD state if [MISR Offset Counter]>0. The only permitted transition from MISR_OFFSET when the MISR offset counter 550 reaches zero is to the MISR_UNLOAD state.

The MISR offset counter 550 counts down from a stored value when the state of FSM 560 is MISR_OFFSET. Similarly, the MISR unload counter 540 counts down from a stored value when the state of FSM 560 is MISR_UNLOAD. The procedure counter 530 is reset with a new value for each instruction/opcode except when the state of FSM 560 is in the SLEEP state (where the sleep instruction/opcode provides a value for the procedure counter 530 to count a number of sleep clock cycles).

The case of multiple replicated cores operating concurrently presents a unique scheduling opportunity: the multiple copies of the same core may be delivered instructions at the same time. However, there may be a clash of output data in response to a MISR_unload opcode/instruction processed at the same time. In one example, to address this issue the protocol decoder 500 may include the MISR offset counter 550. For instance, one purpose of this counter may be to manage the sequencing of outputs of copies of the same core. For non-replicated cores, this counter is uniformly initialized to 0. To accommodate one or more MISR offsets, the scheduling may take into account the largest MISR offset value for a plurality of replica cores. In one example, the procedure counter 530 may remain at zero (0), where a correct latency may be obtained through the insertion of padding cycles (as for the core-level patterns). For example, these replica cores may still be placed back into a SLEEP state by a same SLEEP opcode delivered to all of the cores/blocks at the same time. However, the first block/core to finish unloading may wait for the last core (with the largest MISR offset timing) to finish unloading. During this time, the shared testing input bus may remain idle/no instructions and no payload. This can be implemented either as a constraint on pattern porting (e.g., all procedure counter values are 0) or through a single bit configuration that makes the protocol decoder 500 insensitive to non-opcode bits in opcode cycles (and similarly for other protocol decoders in the scheduling group, or scan/test group). Accordingly, the scheduling may omit considerations beyond determining initial values of the MISR offset counters for the different replicas of the same core. In an example in which the protocol decoder 500 is associated with a replica core and is assigned an MISR offset timing, the correct timing value for MISR offset counter 550 may be reset via additional assertion of the corresponding timing value on test_mode_in.

It should be noted that in other, further, and different examples, the protocol decoder 500 may include more or less elements, may utilize different elements that provide the same or substantially the same functions, and so forth. For instance, in one example, protocol decoder 500 may further include a scan/test enable input, a clock output signal (e.g., to pass the clock_in to the associated block/core and/or one or more downstream elements, etc.), and so forth. In one example, test_mode_in may include additional bits for further functions. For instance, an additional bit may be used to provide bypass mode control (e.g., to place protocol decoder 500 in a pass-through configuration). In one example, different ATPG protocols may be used to generate test pattern data sets for a device under test (DUT). In addition, in such an example, the protocol decoder 500 may be protocol-aware, where an additional bit, or bits of test_mode_in may be used to identify the ATPG protocol being used. In such case, there may be additional registers, a different FSM, or the like, which may be selectively activated and/or deactivated depending upon the ATPG protocol being indicated by test_mode_in. For instance, different protocols may have different opcode widths, the opcodes may have different meanings, and so on. Thus, these and other modifications are all contemplated within the scope of the present disclosure.

Figure 6:
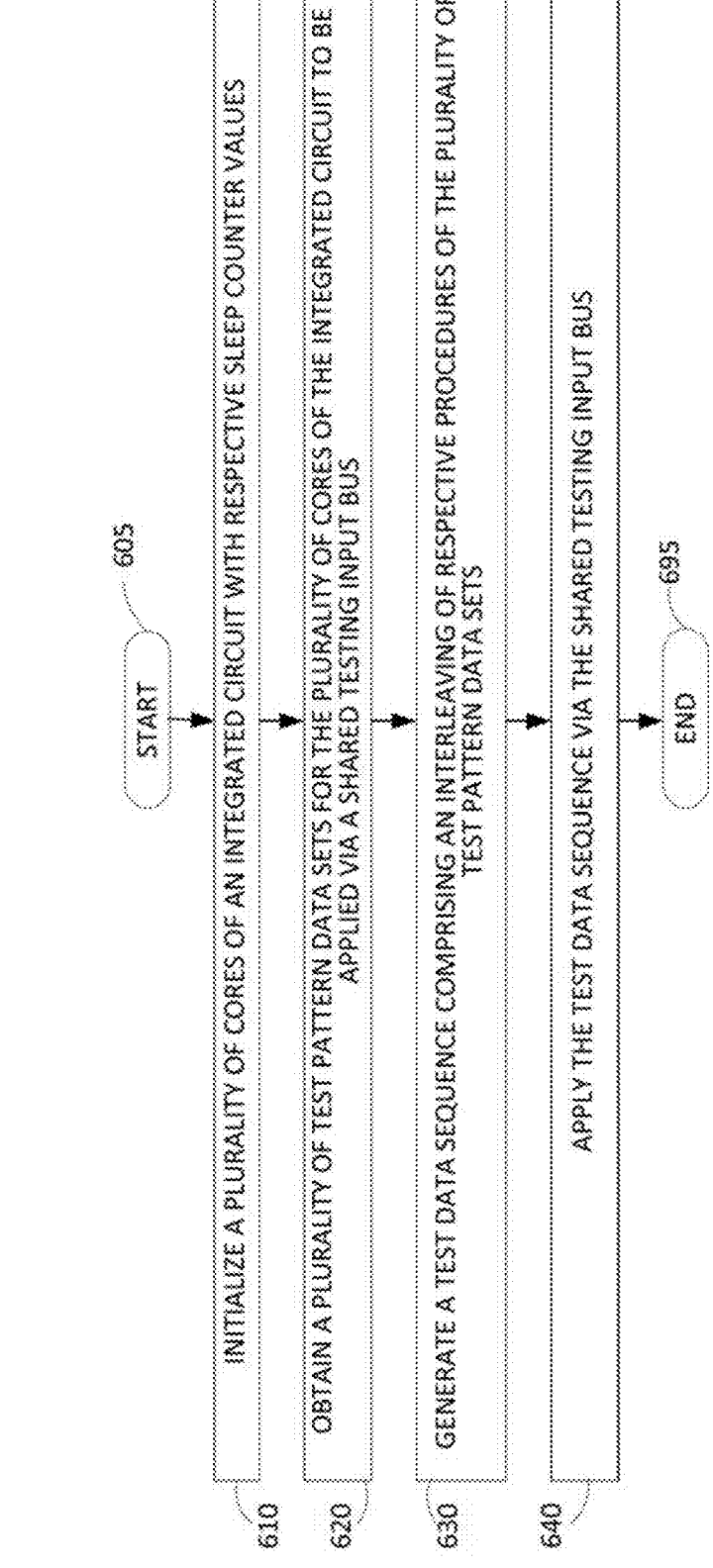
FIG. 6 illustrates a flowchart of an example method for generating a test data sequence including an interleaving of respective procedures of a plurality of test pattern data sets for a plurality of cores of an integrated circuit to be applied via a shared testing input bus.

FIG. 6 illustrates a flowchart of an example method 600 for generating a test data sequence including an interleaving of respective procedures of a plurality of test pattern data sets for a plurality of cores of an integrated circuit to be applied via a shared testing input bus. In one example, the method 600 may be performed by a computing device or system, e.g., a processing system including at least one processor, a memory storing instructions, which when executed by the at least one processor, cause the processing system to perform operations, etc. For instance, the method 600 may be performed by a processing system including at least one processor, such as the computer system 900 of FIG. 9, and/or any one or more components thereof, such as processing device 902, or multiple instances of computer system 900 in communication over one or more networks and operating collectively to perform one or more aspects of the method 600. For illustrative purposes, the method 600 is described in connection with an example performed by a processing system. The method 600 begins in 605 and may proceed to 610 or to 620.

At 610, the processing system may initialize a plurality of cores of an integrated circuit (e.g., a scheduling group, or test/scan group) with respective sleep counter values indicating a number of clock cycles to sleep with respect to a test clock prior to obtaining an initial instruction for each respective core. In one example, 610 may further include initializing one or more unload offset counters/registers, e.g., for respective cores of the plurality of cores that may include replicas of the same core design and which may receive the same procedures/instructions in parallel/at the same time. For instance, an unload offset counter/register may include an MISR offset counter/register as described above. In one example, 610 may further include initializing an unload counter (e.g., an MISR unload counter/register).

At 620, the processing system obtains a plurality of test pattern data sets for the plurality of cores of the integrated circuit (IC) to be applied via a shared testing input bus. For instance, the shared testing input bus may include a scan input bus. In one example, each test pattern data set of the plurality of test pattern data sets may include a series of alternating one or more procedures of the plurality of procedures and whitespace data (e.g., whitespace data blocks). In particular, the whitespace data may include at least one clock cycle in a test pattern data set in which data values are irrelevant for a respective core associated with the test pattern data set (e.g., at least one of: at least one data capture cycle, at least one dataless shift cycle, at least one unload cycle (e.g., MISR Unload), or one or more no-operation (no-op) cycles). In addition, each procedure of the plurality of procedures includes at least one instruction, e.g., one or more opcodes. In one example, at least one procedure of the plurality of procedures may further include a payload. For instance, the payload, or payload data may include test pattern(s), e.g., seed data for loading into one or more scan chains and/or for dataless shift (e.g., dataless load), data for one or more registers of a protocol decoder of one or more cores, etc. In general, a "procedure" is a contiguous block of valid data in one or more test clock cycles (e.g., scan clock cycles), while whitespace is all don't-care data in a test pattern data set.

At 630, the processing system generates a test data sequence including an interleaving of respective procedures of the plurality of test pattern data sets, where the generating of the test data sequence includes generating sleep instructions for respective cores of the plurality of cores in accordance with the interleaving. In one example, the interleaving of respective procedures may be to minimize an overall completion time for a testing of the plurality of cores in accordance with the plurality of test pattern data sets, e.g., to reduce an overall completion time for a testing of the plurality of cores in accordance with the plurality of test pattern data sets as compared to a sequential application of the plurality of test pattern data sets, or the like. In one example, a respective sleep instruction for a respective core of the plurality of cores is included in the test data sequence in association with each procedure of the plurality of procedures. For instance, each sleep instruction may indicate a number of clock cycles of a test clock to ignore the test data sequence via the shared testing input bus. As noted above, in one example, each core may be initialized with a respective sleep counter value indicating a number of clock cycles to sleep with respect to a test clock prior to obtaining an initial instruction. In this regard, it should be noted that the sleep instructions may be non-uniform/non-periodic in accordance with the interleaving. In other words, the sleep instructions are not at uniform intervals, but depend upon the various number of clock cycles for respective procedures, the order of procedures within respective test pattern data sets, and/or the particular test pattern data sets associated with cores in a particular scan/test group from which to choose successive procedures to place on the shared testing input bus.

In one example, the interleaving of 630 may include allocating at least a first procedure for a first core to the test data sequence and allocating at least a second procedure for a second core to the test data sequence following the at least the first procedure within the test data sequence. In one example, the generating of the test data sequence at 630 may be in accordance with a scheduling method. For instance, the scheduling method may include random selection from among the plurality of test pattern data sets, round-robin selection, or the like. Alternatively, or in addition, the scheduling algorithm may be based upon one or more heuristics. For instance, such heuristics may include: look-ahead functions (e.g., number of bursts/data cycles/no-op cycles in a sequence), incremental computations, bounding of the distance (time) between two bursts of the same sequence (compacity), K-way parallelization, and so forth. For example, another scheduling algorithm may include a random selection with bounding distance as a constraint. In one example, the generating of the sleep instructions for the respective cores of the plurality of cores may include selecting a number of sleep cycles for the second core based upon a first number of clock cycles of the at least the first procedure and selecting a number of sleep cycles for the first core based upon a second number of clock cycles of the at least the second procedure. It should be noted that the sleep instructions (e.g., the duration/number of sleep cycles) can be further based on number of clock cycles for other cores if in a system with more than two cores in a scheduling group, or scan/test group.

In one example, the processing system may schedule conflict-free timings of unload operations for the plurality of cores based upon the test data sequence. For instance, 630 may include identifying at least two unload operations of two test pattern data sets falling in the same time slot in accordance with at least two instructions in the test data sequence. The processing system may then select at least one timing delay for at least one of the at least two unload operations to at least one un-unoccupied time slot. In one example, the at least one timing delay may include padding one or more clock cycles with no operations. In addition, the processing system may adjust the test data sequence in accordance with the at least one timing delay that is selected.

At 640, the processing system applies the test data sequence via the shared testing input bus. For instance, the processing system may place the test data sequence on a shared testing input bus via which the test data sequence may be delivered to the plurality of cores (e.g., to respective protocol decoders thereof to select which data on the shared testing input bus to process and which to ignore).

Following 640, the method 600 proceeds to 695 where the method 600 ends.

It should be noted that method 600 may be expanded to include additional steps, or may be modified to replace steps with different steps, to combine steps, to omit steps, to perform steps in a different order, and so forth. For instance, in one example, the processing system may repeat one or more steps of the method 600, such as 610-640 or 620-640 for additional circuits and/or other portions of an integrated circuit (e.g., different scheduling groups, or scan/test groups, etc.). In one example, the method 600 may be expanded or modified to include steps, functions, and/or operations, or other features described in connection with the example(s) of FIGS. 1-5, 7, 8, and/or 9, or as described elsewhere herein. Thus, these and other modifications are all contemplated within the scope of the present disclosure.

FIG. 7 illustrates a flowchart of an example method 700 for performing tasks in response to procedures obtained via a shared testing input bus according to sleep instructions including a number of clock cycles to ignore data on the shared testing input bus. In one example, the method 700 may be performed by a computing device or system, e.g., a processing system including at least one processor, a memory storing instructions, which when executed by the at least one processor, cause the processing system to perform operations, etc. For instance, the method 700 may be performed by a processing system including at least one processor, such as the computer system 900 of FIG. 9, and/or any one or more components thereof, such as processing device 902, or multiple instances of computer system 900 in communication over one or more networks and operating collectively to perform one or more aspects of the method 700. In one example, the method 700 may be performed by a circuit or a portion thereof, e.g., a module, such as a protocol decoder as described above in connection with FIG. 5, which in one example may also be referred to as a processor, or a processing device/system. For illustrative purposes, the method 700 is described in connection with an example performed by a module of a first core of a plurality of cores of an integrated circuit (e.g., a circuit module). The method 700 begins at 705 and may proceed to 710 or to 720.

At 710, the module (e.g., of a first core of a plurality of cores of an integrated circuit (IC)) may obtain initialization values for one or more module components (e.g., one or more counters/registers, such as a procedure counter, an offload counter, and/or an offset counter).

At 720, the module obtains a procedure via a shared testing input bus that is shared among the plurality of cores in a scan test group including the first core, the procedure including at least one instruction. In addition, in one example, the at least one instruction may include a procedure duration of the respective procedure (e.g., defined as a number of clock cycles). For instance, the at least one instruction may include an opcode such as illustrated in FIG. 3, along with a procedure duration.

At 730, the module may set a counter with the procedure duration (e.g., a procedure counter/register, such as described above).

At 740, the module performs at least one respective task in accordance with the at least one instruction. In one example, the performing of the at least one respective task may span the procedure duration, and the counter may be decremented at 730 for each clock cycle of a plurality of clock cycles of a test clock. For example, when the at least one instruction includes a load instruction, the at least one respective task may include loading at least one register with data from the shared testing input bus or passing data from the shared testing input bus to the first core (e.g., passing payload data to at least one scan chain and/or to a codec of the first core). For instance, as described above, the core module may include an interface between the shared testing input bus and an input codec of the first core. In addition, the core module may include an interface between an output codec of the first core and a shared output bus. To further illustrate, when the at least one instruction includes an unload instruction, the performing of the first task at 730 may include performing an unload operation in accordance the instruction. In one example, the unload operation is performed with a delay defined in an offset value that is preloaded into the core module (e.g., a value loaded into an unload offset counter/register (e.g., an MISR offset counter)). For instance, the first core and at least a second core of the test group may include a same core design and may therefore be tested with the same test data sequences. They may have the same sleep/wake timing, and procedures, but the outputs may be prevented from being placed be on the shared output bus at the same time by having different unload offsets. It should be noted that the delay may be further in accordance with the unload counter (e.g., a value in an MISR unload counter/register). However, this value may be obtained as part of the instruction(s), and is the same for all cores receiving the instruction, where the core-specific offset is in addition to the unload counter delay.

At 750, the module determines whether a test data sequence for the plurality of cores is completed. If yes, the method 700 may proceed to 795. Otherwise, the method 700 may proceed to 760.

At 760, the module obtains, via the shared testing input bus, a sleep instruction including a number of clock cycles to ignore data on the shared testing input bus. For instance, when in a sleep mode/phase, the module may not process instructions on the shared testing input bus, may not load payloads or other data from the shared input bus to registers or to the first core, etc. In one example, 760 may include loading the number of clock cycles into the procedure counter/register.

At 770, the module may count the number of clock cycles in accordance with the sleep instruction. For instance, 770 may include decrementing the procedure register, which functions as a sleep timer. Following 770, the method 700 may return to 720.

At a second iteration of 720, the module obtains at least a second procedure, and at least a second payload of the test data sequence via the shared testing input bus, in response to a completion of the number of clock cycles, the at least the second procedure including at least a second instruction. For instance, the expiration of the procedure counter while the FSM is in a sleep mode/state may trigger a state transition of the FSM, where a new instruction may be read from the shared testing input bus (and the FSM placed in a new state depending upon the particular instruction type). In one example, the at least the second instruction may include a second procedure duration.

At a second iteration of 730, the module may set the at least the first counter with the second procedure duration.

In a second iteration of 740, the module may perform at least a second task in accordance with the at least the second instruction, e.g., depending upon the particular type of instruction. Following a second iteration of 740, the method 700 may again return to 750.

When a test data sequence for the plurality of cores is completed (e.g., following the second or subsequent iteration(s)), the method 700 may proceed from 750 to 795 where the method 700 ends.

It should be noted that method 700 may be expanded to include additional steps, or may be modified to replace steps with different steps, to combine steps, to omit steps, to perform steps in a different order, and so forth. For instance, in one example, the processing system may repeat one or more steps of the method 700, such as 710-740 on an ongoing basis for additional sleep/wake cycles, e.g., until a test data sequence for the plurality of cores is completed, 710-740 for other test data sequences, and so forth. For instance, an additional test data sequence may be applied for another test pattern data set that may be generated by a different ATPG system. In one example, the method 700 may be expanded or modified to include steps, functions, and/or operations, or other features described in connection with the example(s) of FIGS. 1-6, 8, and/or 9, or as described elsewhere herein.

It should be noted that in one example, a circuit module, such as the module performing the example method 700 of FIG. 7 may include a finite state machine (FSM) to track state changes of the circuit module in accordance with a procedure counter and instructions from a shared testing input bus, where the shared testing input bus may be shared among a plurality of cores, and where the circuit module may be associated with a first core of the plurality of cores. For instance, the circuit module may further include the procedure counter, which may obtain counter values from instructions on the shared testing input bus and may decrement the counter values in accordance with a test clock. The circuit module may further include a first multiplexer including at least an input port for the shared testing input bus and a first select line that is controlled by the FSM. For example, the first multiplexer may pass data on the shared testing input bus to a codec of the first core when the FSM is in a load state. In addition, as noted above, the FSM may be configured to track a plurality of states including: a load state, an unload state, a reset state, and an initialize state. In one example, the circuit module may further include an unload counter.

In one example, the circuit module may further include an unload offset counter. In addition, the plurality of states may further include an unload offset state. The circuit module may further include a second multiplexer including at least a second input from an output codec of the first core and a second select line that is controlled by the FSM, where the second multiplexer may pass data from the output codec of the first core to a shared output bus when the FSM is in an unload load state in accordance with the unload counter. It should be noted that the first multiplexer and the second multiplexer may not pass data when the FSM is in the unload offset state in accordance with the unload offset counter. As noted above, the FSM may change from the unload offset state to the unload state when the unload offset counter expires, e.g., reaches zero. It should again be noted that the FSM may change from the unload state to the sleep state or the load state in accordance with a next instruction after an expiration of the unload counter.

It should be noted that each of the example methods 600 and 700 may be expanded to include additional steps, or may be modified to replace steps with different steps, to combine steps, to omit steps, to perform steps in a different order, and so forth. In addition, although not specifically specified, one or more steps, functions, or operations of the method 600 or the method 700 may include a storing, displaying, and/or outputting step as required for a particular application. In other words, any data, records, fields, and/or intermediate results discussed in the method 600 and/or the method 700 can be stored, displayed and/or outputted either on the device executing the method 600 and/or the method 700, or to another device, as required for a particular application. Furthermore, steps, blocks, functions, or operations in FIGS. 6 and 7 that recite a determining operation or involve a decision do not necessarily require that both branches of the determining operation be practiced. In other words, one of the branches of the determining operation can be deemed as an optional step. In addition, one or more steps, blocks, functions, or operations of the above described method 600 and/or method 700 may include optional steps, or can be combined, separated, and/or performed in a different order from that described above, without departing from the examples of the present disclosure.

Figure 8:
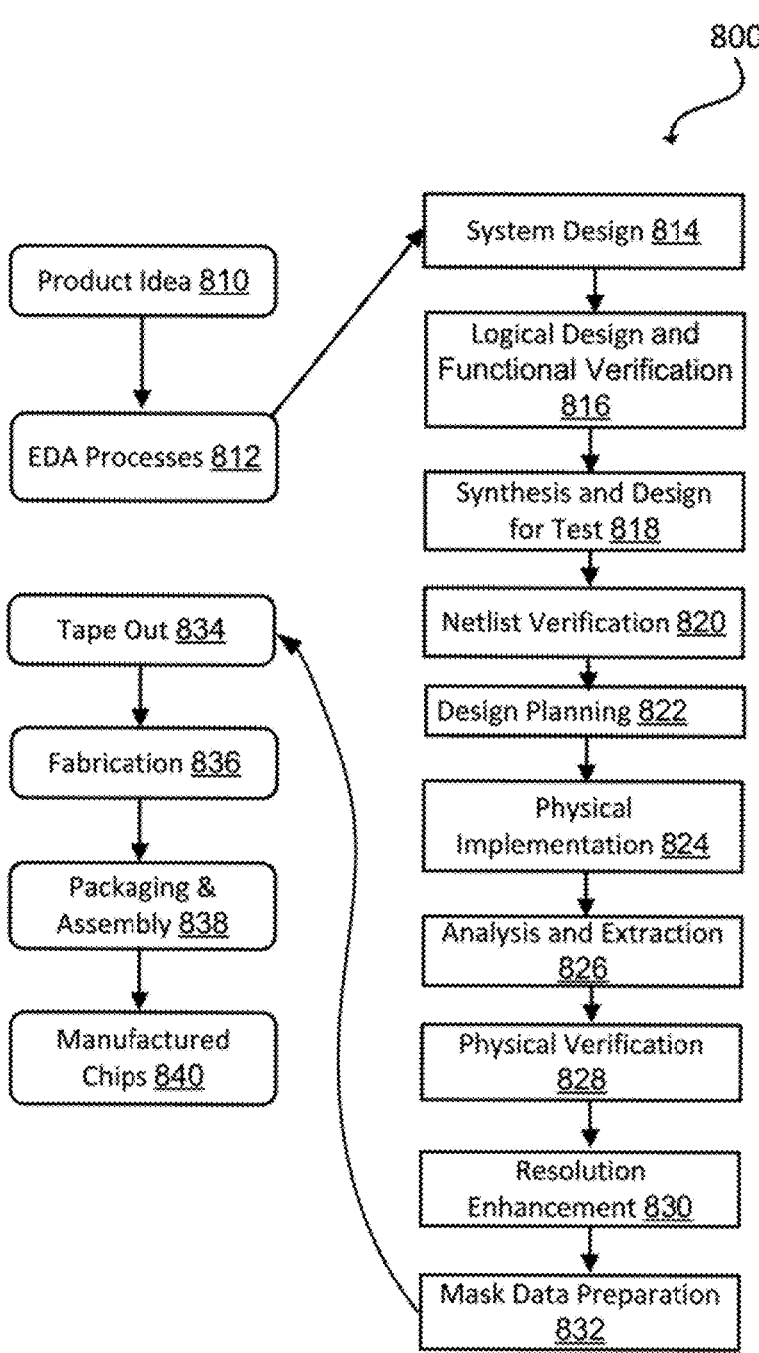
FIG. 8 illustrates a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful details into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 8. The described processes may be enabled by EDA products (or EDA systems).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
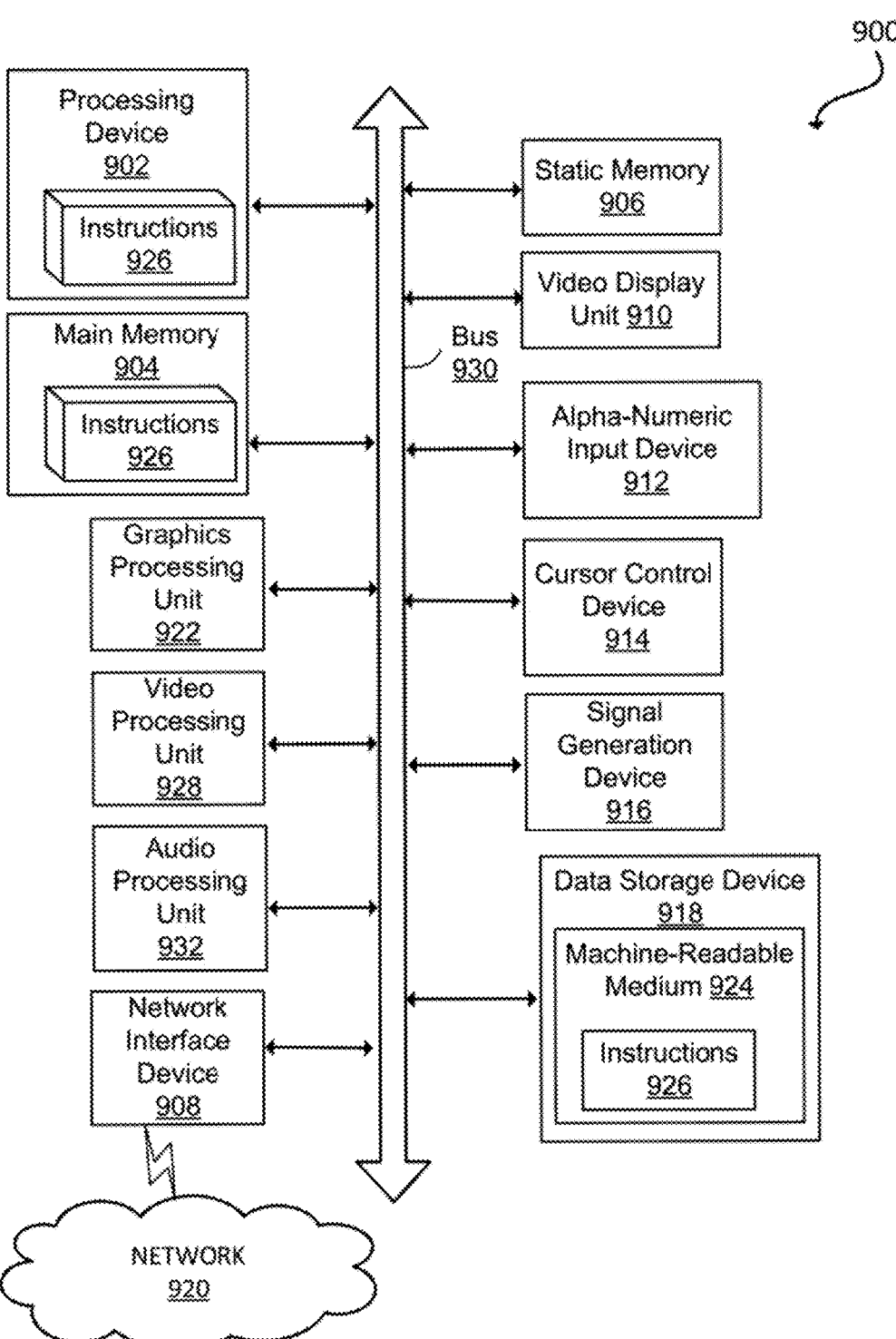
FIG. 9 illustrates a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the present disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the present disclosure have been described with reference to specific example implementations thereof. It will be evident that various modifications may be made thereto without departing from the broader spirit and scope of implementations of the present disclosure as set forth in the following claims. Where the present disclosure refers to some elements in the singular tense, more than one element can be depicted in the figures and like elements are labeled with like numerals. The present disclosure and drawings are, accordingly, to be regarded in an illustrative sense rather than a restrictive sense.

What is claimed is:

1. A method comprising:
obtaining a plurality of test pattern data sets for a plurality of cores of an integrated circuit to be applied via a shared testing input bus;
generating, by a processing device, a test data sequence comprising an interleaving of respective task procedures of the plurality of test pattern data sets, wherein the generating of the test data sequence comprises generating sleep instructions for respective cores of the plurality of cores in accordance with the interleaving, and wherein each sleep instruction of the sleep instructions indicates a number of clock cycles of a test clock for a respective core of the plurality of cores to ignore the test data sequence via the shared testing input bus; and
applying the test data sequence via the shared testing input bus.

2. The method of claim 1, wherein the shared testing input bus comprises a scan input bus.

3. The method of claim 1, wherein each task procedure of the task procedures comprises an instruction.

4. The method of claim 3, wherein at least one task procedure of the task procedures further comprises a payload.

5. The method of claim 3, wherein the instruction comprises an operation code.

6. The method of claim 1, wherein a respective sleep instruction for a respective core of the plurality of cores is included in the test data sequence in association with each task procedure of the task procedures.

7. The method of claim 1, wherein each core of the plurality of cores is initialized with a respective sleep counter value indicating a number of clock cycles to sleep with respect to the test clock prior to obtaining an initial instruction.

8. The method of claim 1, wherein the generating of the test data sequence is in accordance with a scheduling method.

9. The method of claim 1, wherein the interleaving comprises:
allocating at least a first task procedure for a first core of the plurality of cores to the test data sequence; and
allocating at least a second task procedure for a second core of the plurality of cores to the test data sequence following the at least the first task procedure within the test data sequence.

10. The method of claim 9, wherein the generating of the sleep instructions for the respective cores of the plurality of cores comprises:
selecting a number of sleep cycles for the second core based upon a first number of clock cycles of the at least the first task procedure; and
selecting a number of sleep cycles for the first core based upon a second number of clock cycles of the at least the second task procedure.

11. The method of claim 1, wherein each test pattern data set of the plurality of test pattern data sets comprises a series of alternating one or more task procedures of the task procedures and whitespace data.

12. The method of claim 11, wherein the whitespace data comprises at least one clock cycle in a test pattern data set of the plurality of test pattern data sets in which data values are irrelevant for a respective core associated with the test pattern data set.

13. A non-transitory computer readable medium comprising stored instructions, which when executed by a processor of a first core of a plurality of cores of an integrated circuit, cause the processor to:

obtain at least a first procedure via a shared testing input bus that is shared among the plurality of cores in a scan test group, the at least the first procedure comprising at least a first instruction;

perform at least a first task in accordance with the at least the first instruction;

obtain, via the shared testing input bus, a sleep instruction comprising a number of clock cycles to ignore data on the shared testing input bus; and obtain at least a second procedure via the shared testing input bus, in response to a completion of the number of clock cycles, the at least the second procedure comprising at least a second instruction, wherein at least one additional procedure for another core of the plurality of cores is presented on the shared testing input bus between the at least the first procedure and the at least the second procedure.

14. The non-transitory computer readable medium of claim 13, wherein the stored instructions further cause the processor to:

count the number of clock cycles in accordance with the sleep instruction.

15. The non-transitory computer readable medium of claim 14, wherein stored instructions cause the processor to count the number of clock cycles by:

loading at least a first counter with the number of clock cycles; and for each clock cycle of a test clock, decrementing the at least the first counter.

16. The non-transitory computer readable medium of claim 15, wherein the at least the first instruction includes a first procedure duration of the first procedure, wherein the stored instructions further cause the processor to:

set the at least the first counter with the first procedure duration, wherein the performing of the at least the first task spans the first procedure duration, and wherein the at least the first counter is decremented for each clock cycle of a plurality of clock cycles of a test clock.

17. The non-transitory computer readable medium of claim 13, wherein the at least the first instruction comprises a load instruction, and wherein the at least the first task comprises:

loading at least one register with data from the shared testing input bus; or passing data from the shared testing input bus to the first core.

18. The non-transitory computer readable medium of claim 13, wherein the at least the first instruction comprises an unload instruction, wherein the performing of the at least the first task includes performing an unload operation in accordance with the at least the first instruction, and wherein the unload operation is performed with a delay defined in an offset value that is preloaded into the first core.

19. A circuit comprising:

a finite state machine to track state changes of the circuit in accordance with a procedure counter and instructions from a shared testing input bus, wherein the shared testing input bus is shared among a plurality of cores, wherein the circuit is associated with a first core of the plurality of cores, and wherein the finite state machine is placed into a sleep state in response to a sleep instruction on the shared testing input bus;

the procedure counter to obtain counter values from the instructions on the shared testing input bus and to decrement the counter values in accordance with a test clock, wherein the procedure counter counts down a number of clock cycles in accordance with the sleep instruction when the finite state machine is placed into the sleep state; and a multiplexer including at least:

an input port for the shared testing input bus; and a first select line that is controlled by the finite state machine, wherein the multiplexer is to pass data on the shared testing input bus to a codec of the first core when the finite state machine is in a load state.

* * * * *